Sept. 21, 1926.
E. J. HARVEY
1,600,331
OILER FOR SPRINGS OR OTHER DEVICES TO BE LUBRICATED
Filed Sept. 15, 1924
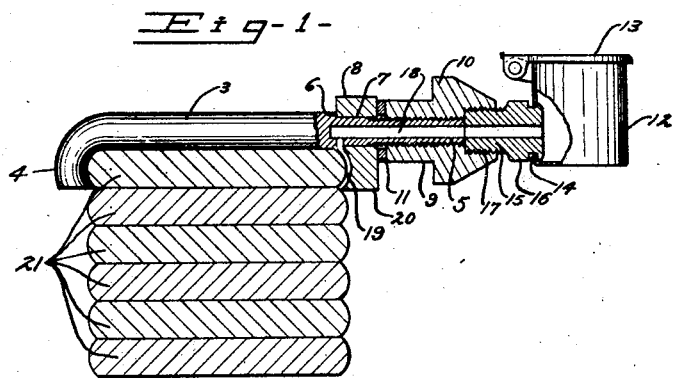
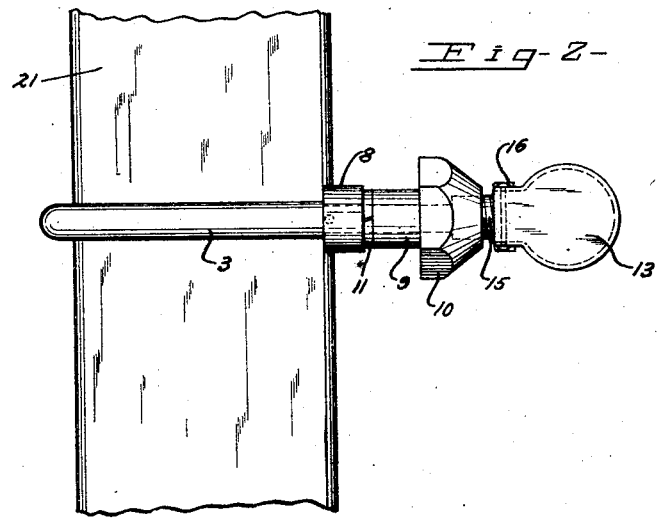
INVENTOR.
Edward J. Harvey,
BY Morsell, Keeney & Morsell
ATTORNEYS Patented Sept. 21, 1926.

1,600,331

UNITED STATES PATENT OFFICE.

EDWARD J. HARVEY, OF RACINE, WISCONSIN.

OILER FOR SPRINGS OR OTHER DEVICES TO BE LUBRICATED.

Application filed September 15, 1924. Serial No. 737,788.

My invention has relation to an improved oiler for springs, or other devices to be lubricated.

It is, of course, a great advantage that the springs of a vehicle, and particularly an automobile, be frequently oiled or lubricated.

It is a common practice to spread oil or kerosene over the leaves of a spring by an ordinary paint brush, relying upon the oil working its way in between the leaves constituting the spring.

Or, again, in garages, the leaves of the spring are spread apart by suitable implements, and oil forced into the spaces between the leaves.

These methods not only require considerable time and effort, but furthermore do not attain entirely satisfactory results.

The primary object of my invention is to provide an oiling device designed to be carried by the spring, and to automatically feed oil from a tank or reservoir, forming part of the device, to the under side of the top leaf of the spring, the said oil then passing or travelling to and between the successive lower leaves of the springs, with the result that a constant supply of the lubricant is carried between the plates or leaves, and hence the spring is maintained in a thoroughly lubricated condition.

With the above primary object, and other incidental objects, in view, the invention consists of the devices and parts, or the equivalents thereof, as hereinafter more fully described.

In the accompanying drawing;

Fig. 1 is a transverse section of a series of leaves of an ordinary automobile spring, showing my improved device clamped to the upper leaf or plate thereof, portions of said device being broken away; and Fig. 2 is a plan view of the top leaf of the spring showing the oiler in connection therewith.

Referring to the drawing, the numeral 3 indicates the clamping rod or arm of the device. One end of this rod is provided with a downwardly turned or hooked portion 4, and the opposite end, for a desired distance, is reduced, as indicated by the numeral 5, the reduction in diameter forming an annular shoulder 6. For a short distance outwardly from the shoulder 6, the reduced portion is plain or unthreaded, as indicated by the numeral 7, whereas the remainder of the reduced portion is threaded.

Mounted on the plain portion 7 is a clamping collar 8, which is adapted to be forced against the shoulder 6.

A nut 9 is adapted to be screwed onto the threads of the reduced portion 5, said nut being provided with an outer enlarged hexagonal head 10, for convenience in turning.

Interposed between the inner end of the nut and the opposed face of the clamping collar 8 is a metallic washer 11, preferably split.

An outer oil tank or reservoir 12 is provided, said tank having an upper open end, which is normally closed by a spring-pressed cover 13.

Passing through and secured in an opening 14 of the lower portion of the tank is a tube 15. This tube may, if desired, consist of an integral extension projecting from the hexagonal head of the nut, but I prefer to make the tube separate, and provide thereon a hexagonal turning head 16. The inner end of this tube is threaded for a desired distance as indicated by the numeral 17, the said threads engaging interior threads formed in the enlarged bore of the hexagonal head 10 of the nut 9. The bore of the tube 15 communicates, at one end, with the interior of the tank, and at its opposite end with a longitudinal bore 18 formed in the reduced portion 5 of the clamping rod 3. This bore 18 in turn communicates with an oil passage or recess 19, formed in the inner face of a depending portion 20 of the clamping collar 8.

The numeral 21 indicates the several leaves of the spring, and it will be noted that the lower end of the oil passage or recess 19 terminates at a point where the oil flowing therethrough can pass between the contiguous or meeting faces of the two uppermost plates or leaves of the spring.

In adjusting the device to the upper plate or leaf of the spring, the hooked portion 4 of the clamping rod is first made to engage over the curved edge of said upper plate, the nut 9, of course, having first been loosened, in order to permit the clamping collar 8 to arrange itself adjacent the opposite rounded edge of the upper plate of the spring. The clamping collar 8 is then slid along the plain portion 7, until it abuts against the shoulder 6. The nut 9 is now tightened, and this will have the effect of forcing the split washer firmly against the outer face of the clamping collar 8.

It is obvious that whenever it is desired to remove the device, all that is necessary to be done is to loosen the nut 9, which will, of course, release the clamping effect of the collar 8, and permit of the entire device being disengaged from the upper plate of the spring.

In operation, the oil or lubricant within the tank flows through the bore of the tube 15, thence through the bore 18 of the reduced portion 5 of the clamping rod, and thence into the oil passage 19 and downwardly therein to and between the flat contacting faces of the different leaves of the spring.

From the foregoing, it will be seen that my invention is not only of a simple character, but furthermore is one that can be most readily adjusted to or removed from the upper plate or leaf of the spring, and that the arrangement is such that perfect lubrication over the entire spring is obtained.

Furthermore, the device is so constructed that it can be dismantled for cleaning and other purposes.

What I claim as my invention is:

1. An oiler for springs, comprising an oil reservoir, an arm extending horizontally therefrom, said arm being arranged to pass over the top leaf of a spring of the multiple leaf type, said arm being provided at one end with a fixed clamping jaw for engagement with one edge of the top leaf of the spring, and being further provided with an oil passage in communication at one end with the oil reservoir, and at the opposite end in communication with a branch passage of such length that the lower end thereof will terminate at a point to cause oil to flow between the meeting faces of the two upper leaves of the spring, a slidable clamping member on the arm for engagement with the opposite edge of the top leaf of the spring, and means for forcing and releasably retaining the collar in clamping position.

2. An oiler for springs, comprising an arm adapted to be secured over the top leaf or plate of a spring of the multiple leaf type, said arm provided medially with a shoulder and with a plain or unthreaded reduced portion next to the shoulder, the remainder of the reduced portion being threaded, the said reduced portion also provided with an interior longitudinal passage extending outwardly to the end thereof, a clamping collar slidable on the plain unthreaded portion of the arm, and provided with a downwardly extending projection having an oil channel or passage of such length that the lower end thereof will discharge the oil between the meeting faces of the two upper leaves of the spring, and with which oil passage the longitudinal oil passage of the reduced portion of the arm communicates, a nut on the threaded portion of the arm and adapted to be turned so as to force the clamping collar against the shoulder of the arm, and means for supplying a lubricant to the longitudinal oil passage of the reduced portion of the arm.

3. An oiler for springs, comprising an arm adapted to be secured over the top leaf or plate of a spring of the multiple leaf type, said arm provided medially with a shoulder and with a reduced portion extending from the shoulder, the reduced portion next to the shoulder being plain or unthreaded, and the remainder of said reduced portion being threaded, and said reduced portion also provided with an interior longitudinal passage extending outwardly to the end thereof, a clamping collar slidable on the plain unthreaded portion of the arm, and provided with a downwardly extending projection having an oil channel or passage of such length that it will terminate at a point to cause the oil to flow between the meeting faces of the two upper leaves of the spring, and with which oil passage the longitudinal oil passage of the reduced portion of the arm communicates, a nut on the threaded portion of the arm, a washer mounted on the arm between the inner end of the nut and the clamping collar, and means for supplying a lubricant to the longitudinal oil passage of the arm.

4. An oiler for springs, comprising an arm adapted to be secured over the top leaf or plate of a spring of the multiple leaf type, said arm provided medially with a shoulder, and with a reduced portion extending from the shoulder, said reduced portion next to the shoulder for a desired distance being plain or unthreaded, and the remainder of the reduced portion being threaded, and said reduced portion also provided with an interior longitudinal passage extending outwardly to the end thereof, a clamping collar slidable on the plain unthreaded portion of the arm, and provided with a downward extension having an oil channel or passage of such length that the lower end thereof will be in a position to discharge the oil between the meeting faces of the two upper leaves of the spring, and with which oil passage the longitudinal oil passage of the reduced portion of the arm communicates, a nut on the reduced threaded portion of the arm, and adapted to be turned so as to force the clamping collar against the shoulder of the arm, an oil reservoir provided with an opening, and a threaded tube fitting said opening, said tube communicating with the oil passage of the arm, and the threads of the tube adapted to engage the threads of the nut.

In testimony whereof, I affix my signature.

EDWARD J. HARVEY.